Oct. 26, 1926.

C. E. STONER

DECOY

Filed May 13, 1925   3 Sheets-Sheet 1

1,604,615

Witnesses:
William P. Kilroy
Harry R. L. White

Inventor
Carlton E. Stoner
By
Attys.

Oct. 26, 1926.
C. E. STONER
DECOY
Filed May 13, 1925 — 3 Sheets-Sheet 2
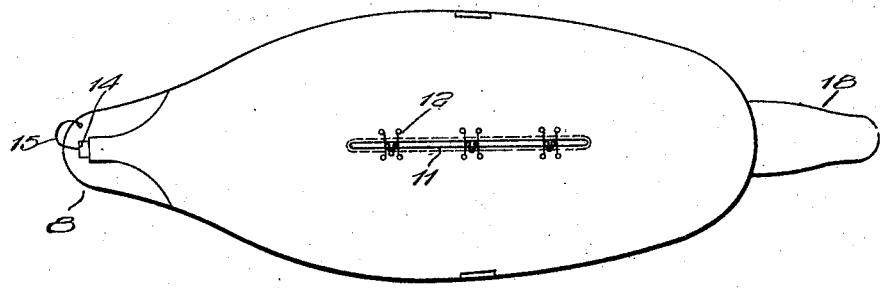
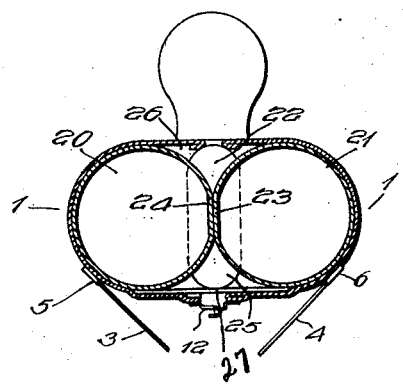 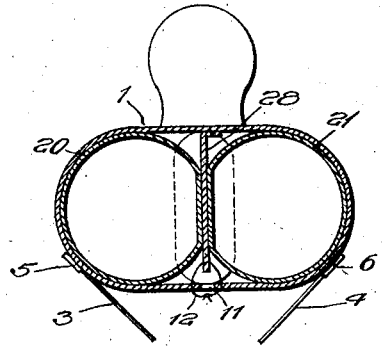
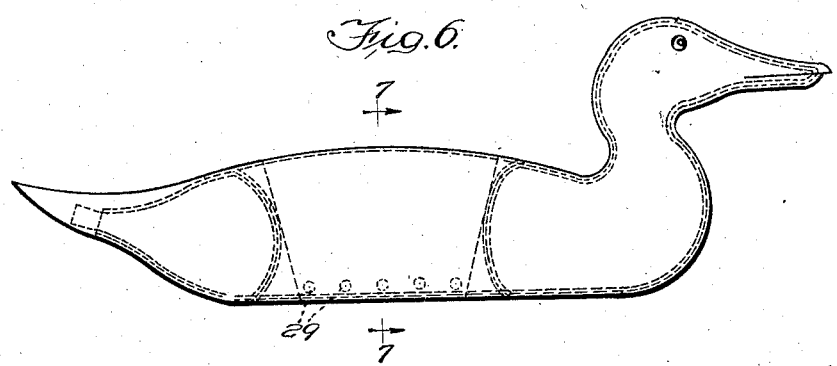
Witnesses:
William R. Kilroy
Harry R. L. White
Inventor:
Carlton E. Stoner Oct. 26, 1926.                                            1,604,615
                       C. E. STONER
                          DECOY
              Filed May 13, 1925          3 Sheets-Sheet 3
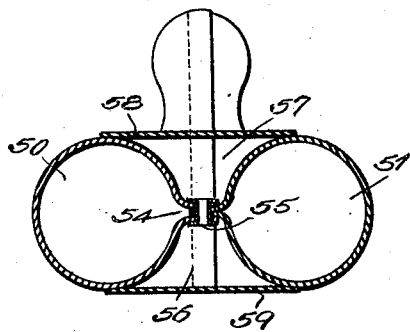
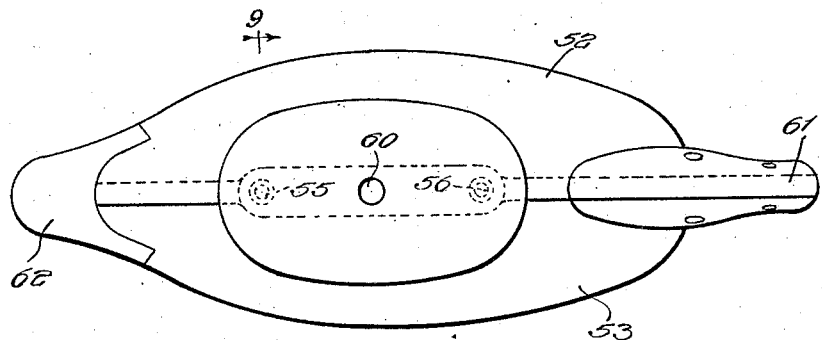
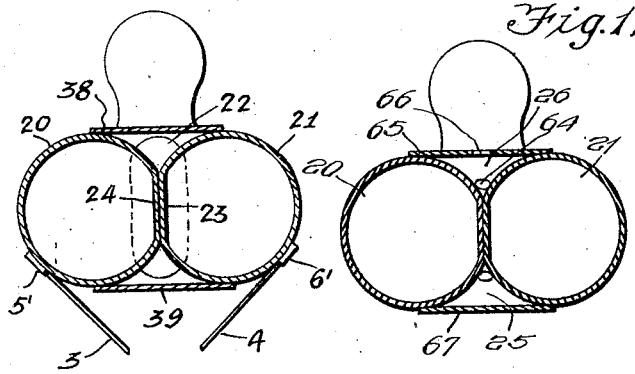
Witnesses:
William P. Kilroy
Harry R. L. White
Inventor
Carlton E. Stoner
By
Attys.

Patented Oct. 26, 1926.

1,604,615

UNITED STATES PATENT OFFICE.

CARLTON ELMER STONER, OF LONG BEACH, CALIFORNIA.

DECOY.

Application filed May 13, 1925. Serial No. 29,854.

My invention relates to decoys of the inflatable type.

It is a defect of decoys as now constructed, particularly inflatable decoys, that in an endeavor to make them light, so that they are easily carried about, they are so buoyant that they sit too high upon the water and give an unnatural and undesirable appearance. The only way that this can be corrected, according to the prior art, is to add weight or sinkers, but that means the carrying of objectionable weight and this in small pieces which are easily lost or displaced or which may become separated from the body of the decoy.

According to the present invention I provide an inflatable decoy with means for ballasting it with water, so that the user can set the decoy at just the right depth in the water to make the decoy appear life-like under the surroundings in which it is placed.

A separate weight may be employed to steady the decoy in the water, and the water ballast employed to give it the proper setting or displacement in the water to give it the desired low squat appearance of a water bird.

Instead of actually loading the body of the decoy with water, that is, of having a higher level of water in the body of the decoy than the level of the water in which it is floating, I may give the body the desired squat form by suitable construction thereof, or I may cut away a part of the body of the decoy and permit it thereby to assume the proper position of displacement in the water.

Preferably, but not necessarily, the decoy is arranged to permit the retention of a separate level of water in the body thereof, so that the displacement of the decoy in the water may be suitably controlled to make it lower or higher at the option of the user.

A further and separate feature of the present invention is the production of a decoy with a low flat and squat looking body, which will simulate in appearance the actual lines of the game which it is intended to simulate. The inflatable decoys of the prior art are peculiarly lacking in true proportions, because of the use of a jacket or casing which is distended or inflated by a rubber air bag or bladder, which tends to assume a cylindrical section at all points.

According to the present invention I provide means which may take the form of a central stay or wall or pair of walls for limiting the expansion of the air bag or bladder in a vertical direction, so as to secure greater lateral expansion relative to the vertical expansion. By suitably controlling the said central stay or wall, I am able to give the finished decoy any desired contour.

While in duck decoys a central stay is preferred, I wish it understood that the desired form may be secured by more than one stay and also the positions of the stays may be varied to suit the contour or character of the object represented.

The invention provides other improvements which will be apparent from the following detail description and drawings.

Now, in order to acquaint those skilled in the art with the manner of constructing and operating a device embodying my invention, I shall describe in connection with the accompanying drawings, a specific embodiment of the invention.

In the drawings:

Fig. 4 is a bottom plan view of the decoy, shown in Fig. 1;

Fig. 5 is a section taken on the line 5—5 of Fig. 2;

Fig. 6 is a side elevational view of a modification, showing the air bladder and a vertical stay in dotted lines;

Fig. 7 is a cross section taken on the line 7—7 of Fig. 6;

Fig. 8 is a cross sectional view of a modification;

Fig. 9 is a cross sectional view of a modified form of air bag or bladder, which may be used for a canvas jacket or which may be employed directly with suitable color thereupon for simulating the game which it is intended to decoy taken on line 9—9 of Fig. 10;

Fig. 10 is a plan view of a modification in which the colors are placed directly upon the rubber bag or bladder;

Fig. 11 is a cross sectional view of a modification.

Figure 1:
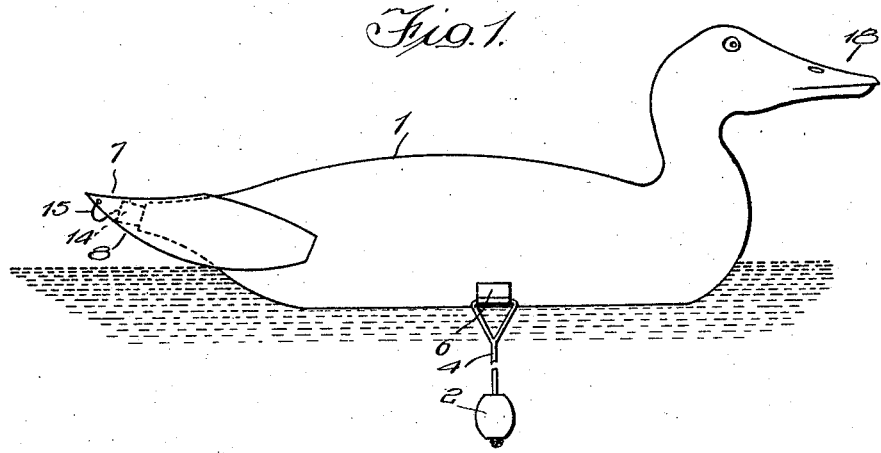
Figure 1 is a side elevational view of a decoy as it appears floating in the water, this decoy simulating a duck.
Figure 2:
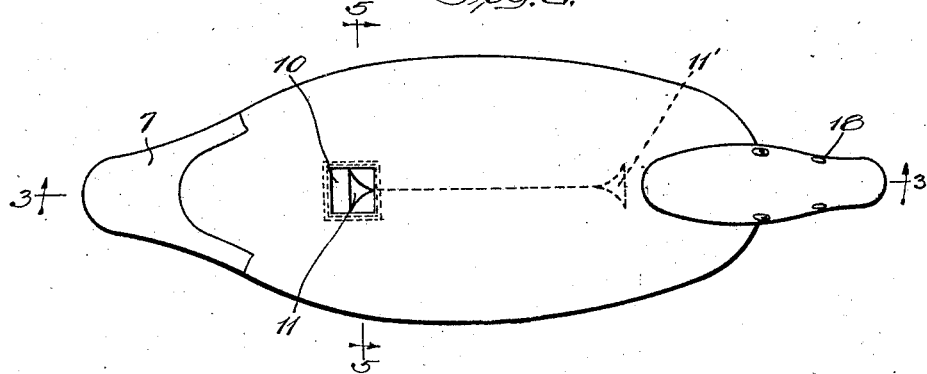
Fig. 2 is a top plan view of the same.

As shown in Figs. 1 to 5, the decoy is intended to simulate a duck. This decoy comprises a canvas casing 1, which is suitably painted or printed to simulate the colors and features of a duck. A suitable steadying weight 2 is attached through the medium of a V-shaped connection comprising the two side strings or cords 3 and 4, which are joined to the weight 2 at their lower end, and at their upper end are joined to the canvas casing 1 by means of suitable tabs or loops 5 and 6. A separate piece of canvas is preferably sewed upon the rear portion of the canvas casing 1, as indicated at 7, to simulate the tail feathers of the duck and, at the same time, to hide the valve 8 by which the rubber bag or bladder 9 is inflated.

Upon the top of the body, preferably towards the rear, although the position thereof may be varied, I place a suitable opening 10, this opening preferably being in line with a passageway 11 through the air bag to permit ballasting of the decoy to the desired extent. This opening 10 is preferably formed in the shape of a rectangular hole, the edges of which are turned in and sewed or seamed to prevent ripping. A cord or braid may be used to reenforce the edges of the opening, so that it will not become torn.

The bottom of the canvas casing is provided with an opening 11 in the nature of a slot, which is preferably finished with a cord or braid so as to reenforce the edges of the same and prevent ripping. This opening 11 is of a size sufficient to permit the introduction of the air bag or bladder 9 and is preferably closed by the metal hooks and eyes, such as are indicated at 12. If desired, the opening may be laced, but I find that hooks and eyes are light and amply strong since the opening 11 is made relatively small, merely large enough for the introduction of the deflated bag or bladder.

The air bag or bladder 9 has a suitable inflating valve 8 which comprises a tubular nipple 13 secured to the rear end of the air bag and cemented thereto to form a tight joint, which may be closed by a suitable rubber plug 14, a string 15 being secured thereto, preferably as indicated in my copending application, by passing a needle and thread through the plug 14, such thread being shown at 15. The thread may be dipped in rubber cement and it forms a tight joint in connection with the rubber plug 14 which may be used.

While I have described the casing as made of canvas, it is to be understood that I do not intend to limit the same strictly to this material, but any suitable jacket, preferably of a light and strong fabric, which will be substantially waterproof and of a close weave, may be employed.

At the front end the air bag 9 has a bill portion 16 which may be filled with a suitably molded or formed filling plug 17 to give the bill of the decoy the desired shape. It is important that the bill portion 18 have as life-like an appearance as is possible, since this is a very characteristic part of the live animal which the decoy simulates.

The body of the air bag 9 is split or divided along the central part into two tubular sections 20 and 21, as will be apparent from Fig. 5. These tubular portions may be substantially cylindrical and unite at the ends where they are joined to the main part or the end parts of the bag. Preferably, I place a relatively stiff rubber patch 22 in the crotch where the two tubular portions join at front and rear, this relatively stiff patch serving the dual function of sealing the joint between the two sections 20 and 21, and also serving to prevent the inner walls 23 and 24 from contacting throughout their entire length and thus closing off the space 25 from the upper space 26. It will be observed that the two contacting tubular sections 20 and 21 tend to stretch laterally the top and bottom of the canvas jacket or casing, and that these spaces 25 and 26 communicate with each other at the ends where the patches 22 hold the walls 23 and 24 apart, so that when water is poured into the opening 10 it will pass down through the opening 11 and fill the lower space 25 to the desired extent, and also the space 26 may be filled to the desired extent.

Instead of using the patches 22 to secure the passageway 11 and 11′ down through the body portion of the air bag or bladder, a small rubber tube may be employed for the same purpose. In fact, any suitable means for securing the space such as 25 or 26, and for permitting water poured into the opening 10 to fill such space or spaces, is considered as coming within the spirit and scope of my invention.

The bottom part of the rubber bag comprises a sheet or plate 27 of the same kind of rubber of which the air bag or bladder is composed. This sheet or plate 27 closes off the bottom of the space 25 and thereby permits water to be held in said space 25 and in said space 26.

It is to be understood that the bottom plate 27 may be omitted and the submergence or displacement may be controlled by a suitable weight, such as the weight 2, the split central portion, that is, the two tubular portions 20 and 21, being relied upon first to reduce the amount of air in the inflated bag or bladder, and second to give the body of the decoy the desired flat and squat appearance. That is to say, the ballasting function may be omitted without departure from the invention.

Thus, for example, in Figs. 6 and 7, I have shown how this may be accomplished by passing a stay 28 down between the two tubular limbs 20 and 21, this stay being preferably made of canvas and sewed in the upper seam of the jacket 1, the lower end of the stay 28 having suitable eyelets 29. The opening 11 in this case is closed by means of a lacing cord 12 which passes through suitable eyelets on each side of the opening 11 and through the eyelets 29 in the lower portion of the stay member 28. In this case, the desired squat shape is secured and the ballasting function is omitted, the central canvas wall or stay 28 serving the desired purpose of controlling the vertical dimensions of the decoy.

The subdivision of the air bag has provided the necessary vertical stay for reducing the height of the decoy.

In the form shown in Figs. 6 and 7, the vertical stay or flap 28 provides additional means, which in this case is manually adjustable for varying the vertical expansion with respect to the lateral expansion, so as to give the decoy the desired appearance.

In Fig. 8 I have shown in cross section a modification in which the colors and lines are placed directly upon the body of the air bag and the central part of the air bag divided into two cells or limbs 20 and 21, as is the air bag in the modification of Figs. 1 to 5, inclusive, but in this case no provision is made for ballasting the duck, except the weight which is hung by the cords 3, 4, secured directly to the cells 20 and 21 by the tabs 5′ and 6′ the plates or patches 38 and 39 at the top and bottom closing off the triangular spaces at the meeting point of the two limbs or cells 20 and 21. Thus, in addition to the central walls 23 and 24 of the limbs or cells 20 and 21, the patches or plates 38 and 39 assist in staying the air bag in such a manner as to give the desired contour to the decoy.

In the modifications illustrated in Figs. 9 and 10, the main part or body of the duck is made up of two halves of rubber in which the central part is divided into two longitudinal limbs or divisions 50 and 51, whereas the end portions are joined into a single open portion. A single unitary seam joins these two portions, which are indicated at 52 and 53, throughout the entire length of the decoy, but along the central portion the top and bottom seams are brought together, as indicated at 54, and small openings, preferably with eyelets therein as indicated at 55 and 54, hold the two seams together, although it will be understood that they may be joined together by vulcanizing or cementing without the use of eyelets, so as to provide tight joints about the openings 55 and 56, but to give the desired staying effect between top and bottom, and to permit of the introduction of water for ballasting purposes in the spaces 56 and 57.

Top and bottom plates or patches 58 and 59 cover the depressions along the center to give a smooth exterior to the decoy and to define the spaces 57 and 56. A suitable hole or a number of holes 60 may be provided in the top plate 58 for the introduction of water.

Figure 3:
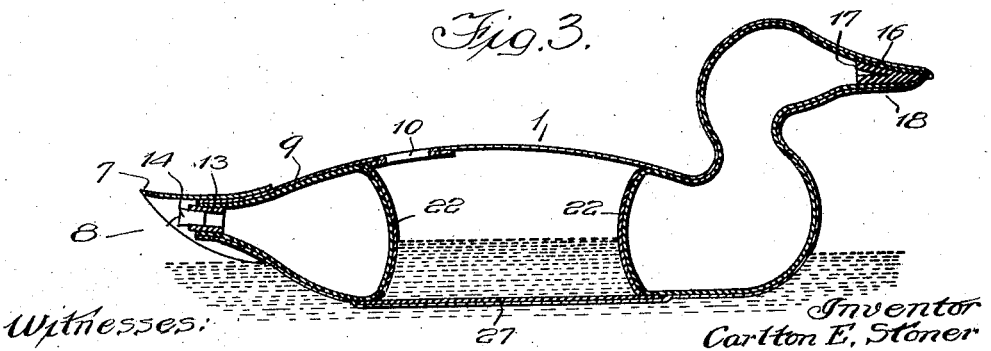
Fig. 3 is a longitudinal section taken on the line 3—3 of Fig. 2.

The bill portion 61 is preferably formed by an interior filling, such as the plug 17 disclosed in connection with the form shown in Figs. 1 to 5, illustrated more particularly in Fig. 3. In using decoys of this character the valve, which is employed at the rear of the decoy and which is covered by the tail portion 62 in Fig. 10, is opened and the decoy is inflated to the desired extent, whereupon the valve is closed. Then, in order to introduce water for ballasting into the space 56, the plates 58 and 59 may be squeezed together with the fingers, the body of the decoy submerged so as to permit the entry of water through the opening 60 and to the passage ways 55 and 56 when the pressure upon the plates 58 and 59 is released. In other words, by squeezing some of the air out of the spaces 56 and 57 and dipping the decoy, water may be sucked into the ballast spaces to the desired extent. It may be expelled in the same manner.

In Fig. 11 I have shown in cross section a modified form in which two tubular portions 20 and 21 are formed as in the form illustrated in Figs. 1 to 5, and instead of having patches at the ends of the tubular portions 20 and 21, for providing an opening between the spaces 25 and 26 for the admission of water ballast to the space 25. small rubber tubes as indicated at 64 are placed at the ends of the two tubular portions 20 and 21 where they join each other, for providing passage ways between the spaces 25 and 26 for the introduction of water ballast. The top plate 65 has an opening 66 therein to permit water to be introduced. The bottom plate or patch 67 is imperforate. In the form shown in Fig. 11 the colors may be applied directly to the air bag, or the air bag may be introduced into a suitable jacket if desired.

It is generally sufficient to fill the lower ballast space, such as 25 and 56, only. This gives the ballast and the decoy a low center of gravity, particularly since the bottom of the ballast space or wall is wider than the central part of the same. This water ballast being low in center of gravity and being restrained from shifting, reduces very greatly the tendency of the decoy to roll. The weight 2 shown in some of the modifications may therefore be dispensed with. The ballast space need not open up through the center part of the body, but I find it simpler and cheaper to construct it in that manner, particularly to facilitate drying of the decoy.

It will be seen from the above that I have provided first, means for staying or reenforcing the body portion in such a manner as to give it an elliptical or flattened cross section, which is highly desirable. In addition, in some of the forms which I have shown, the decoy may be ballasted with water, which is readily introduced and readily expelled. Water ballasting is preferable, since it is always available and no additional weight needs to be carried around by the user of the decoy.

I do not intend to be limited to the details shown and described.

I claim:

1. In a decoy, an inflatable air bag having the general contour of the object to be simulated, said bag being divided longitudinally along the central portion into two tubular portions disposed side by side and connected together at their ends, and means covering the central portion of the air bag at top and bottom to give the desired smooth contour of flattened cross section.

2. In combination, an inflatable air bag of the general contour of the object to be simulated, said air bag having two tubular portions disposed longitudinally along the central part of the air bag, and a bottom plate along said tubular portions, said bottom plate and the side walls of the tubular portions defining a ballast space into which water may be introduced for ballasting the decoy.

3. In combination, a jacket member and an inflating air bag therefor, said inflating air bag having ballast space disposed in the bottom thereof, and an opening through the top of the jacket to permit the introduction of water into the ballast space.

4. In combination, a jacket, an inflating air bag for the jacket, said air bag being divided along the central portion longitudinally into two juxtaposed tubular portions, a bottom plate for said air bag defining in conjunction with said tubular portions a ballast space, said tubular portions distending the jacket to a greater horizontal than vertical diameter, said jacket having an opening therethrough communicating with the ballast space for the introduction of water.

5. In a decoy, a closed inflatable air bag of the contour of the game to be simulated, said air bag having a chamber formed therein for water ballast, said chamber being closed at its sides and bottom and open at its upper side for the introduction or removal of water ballast.

6. In a decoy, an inflatable bag having the general contour of the game to be simulated, said bag having a well in the lower central part for providing space for water ballast.

7. In a decoy, an air bag of the general contour of the object to be simulated, said air bag being divided centrally longitudinally into two adjacent cells communicating with each other and with the ends of the bag at their ends, plates secured to the top and bottom of the air bag and covering the division line between the two cells, the lower plate being imperforate and the upper plate having a filling opening, whereby water may be introduced into the space between the plates for ballasting the decoy.

8. In a decoy, an air bag adapted to be inflated, said air bag being longitudinally divided along the central part and a ballast chamber formed in said bag below said division.

9. In a decoy, an inflatable air bag of the shape of the game to be simulated, said air bag having a chamber in the lower central part of the same to retain water ballast, said chamber being wider at the bottom than at the intermediate portion to promote stability of the decoy.

In witness whereof, I hereunto subscribe my name this 5th day of May, 1925.

CARLTON ELMER STONER.